United States Patent
Qi et al.

(10) Patent No.: US 10,479,863 B2
(45) Date of Patent: Nov. 19, 2019

(54) METHOD FOR CYCLICALLY PREPARING POLYETHER POLYOL BY USING DMC CATALYST

(71) Applicant: Huaian Bud Polyurethane Science & Technology Co., Ltd., Huaian, Jiangsu Province (CN)

(72) Inventors: Weixin Qi, Huaian (CN); Bing Hu, Huaian (CN); Yong Han, Huaian (CN)

(73) Assignee: HUAIAN BUD POLYURETHANE SCIENCE & TECHNOLOGY CO., LTD, Huaian, Jiangsu (CN)

( * ) Notice: Subject to any disclaimer, the term of this patent is extended or adjusted under 35 U.S.C. 154(b) by 197 days.

(21) Appl. No.: 15/513,972

(22) PCT Filed: Mar. 30, 2016

(86) PCT No.: PCT/CN2016/077845
§ 371 (c)(1),
(2) Date: Mar. 23, 2017

(87) PCT Pub. No.: WO2017/156797
PCT Pub. Date: Sep. 21, 2017

(65) Prior Publication Data
US 2018/0171073 A1 Jun. 21, 2018

(30) Foreign Application Priority Data
Mar. 18, 2016 (CN) .......................... 2016 1 0155418

(51) Int. Cl.
*C08G 65/26* (2006.01)
*C08G 65/02* (2006.01)
*C08G 65/12* (2006.01)

(52) U.S. Cl.
CPC .......... *C08G 65/2663* (2013.01); *C08G 65/02* (2013.01); *C08G 65/12* (2013.01); *C08G 65/2603* (2013.01); *C08G 65/2606* (2013.01); *C08G 65/2618* (2013.01); *C08G 65/2636* (2013.01); *C08G 65/2639* (2013.01)

(58) Field of Classification Search
CPC .. C09D 171/00; C09D 171/02; C09D 171/08; C08G 65/2663; C08G 65/1202; C08G 65/2603; C08G 65/2606; C08G 65/2618; C08G 65/2636; C08G 65/2639
See application file for complete search history.

(56) References Cited

U.S. PATENT DOCUMENTS

| 5,391,722 | A | * | 2/1995 | Chandalia | C08G 65/2606 536/120 |
|---|---|---|---|---|---|
| 5,679,764 | A | | 10/1997 | Pazos | |
| 5,689,012 | A | * | 11/1997 | Pazos | C08G 65/2696 502/175 |
| 2005/0209438 | A1 | * | 9/2005 | Browne | C08G 65/2663 528/414 |
| 2009/0292084 | A1 | * | 11/2009 | Sellmann | C08G 65/2609 526/64 |

FOREIGN PATENT DOCUMENTS

| CA | 2328453 C | 7/2008 |
|---|---|---|
| CN | 1225652 A | 8/1999 |
| CN | 103732651 A | 4/2014 |

* cited by examiner

*Primary Examiner* — Shane Fang
(74) *Attorney, Agent, or Firm* — Han IP PLLC; Andy Han

(57) ABSTRACT

A method for preparing a polyether polyol in a continuous reaction cycle is described. In the method, a low molecular-weight alcohol is polymerized with an alkylene oxide to obtain a low molecular-weight polymer. The low molecular-weight polymer is used as an initiator to react with the alkylene oxide and the low molecular-weight alcohol in the presence of a DMC catalyst and an acid promoter to obtain an intermediate-target polymer. A portion of the intermediate-target polymer is used for producing the target polymer, and the other portion is recycled for reproduction of the intermediate-target polymer. No initiator prepared with a base catalyst is used, and thus the loss of material and the discharge of residue and waste water are reduced. The DMC concentration is kept constant in the target polymer during the production such that the dewatering time and induction time are greatly reduced.

20 Claims, No Drawings

METHOD FOR CYCLICALLY PREPARING POLYETHER POLYOL BY USING DMC CATALYST

CROSS REFERENCE TO RELATED PATENT APPLICATIONS

The present disclosure is part of U.S. national phase application of international application PCT/CN2016/077845, filed on Mar. 30, 2016, which claims the priority benefit of China Patent Application No. 2016101554189, filed on Mar. 18, 2016. The aforementioned applications are incorporated by reference in their entirety.

BACKGROUND

Technical Field

The present disclosure relates to the technical field for producing a polyether polyol, and particularly to a method for producing a target polyether polyol through an intermediate-target polyether polyol in a continuous reaction cycle inducted by a double metal cyanide (DMC) catalyst and an acid promoter.

Related Art

At present, the common production method of polyether polyol with a DMC catalyst may involve a low molecular-weight alcohol, for example, propylene glycol (diol) or glycerol (trial) as a starter compound to react with a propylene oxide or a mixture of propylene oxide and ethylene oxide in the presence of an ordinary base catalyst such as potassium hydroxide. An intermediate-target polyether polyol in the form of a dihydroxy compound or a trihydroxy compound with a low molecular weight in the range of 400 or 600 respectively may be obtained during the reaction. The low molecular-weight polyether polyol is then subject to a series of complex processes such as neutralization with phosphoric acid, dewatering by adsorption with an adsorbent and filtering, during which about 2% polyether polyol may be lost, causing great environment concerns. Meanwhile, the low molecular-weight polyether polyol prepared with a base catalyst may have a heavy odor due to a high degree of unsaturation, and thus the final product prepared therewith may have the same obvious odor. The low molecular-weight polyether polyol may be degassed and dewatered at a certain temperature, and react with propylene oxide or a mixture of propylene oxide and ethylene oxide in the presence of a DMC catalyst to form the target product, where the induction time may be generally in the range of ten minutes to 1 hour or longer.

Patent No. CN97192141.5 discloses a method for preparing a polyether polyol in the presence of a DMC catalyst by continuously adding an initiating material. The process of continuously adding the initiating material is unstable and may easily cause the catalyst to be inactivated. The inactivated catalyst may be difficult to be further inducted, causing the whole reaction to fail to proceed forward. Moreover, the target product obtained from the final reaction may have a heavy odor, and a wide molecular-weight distribution (either weight average molecular weight or number average molecular weight). Therefore, the practical application for this process is difficult.

Further, during the reaction process, propylene glycol and alkylene oxide are added to the reaction system together and the addition is terminated at the same time. The reaction is stopped once the feed of both materials is terminated, which directly affects the molecular weight distribution and hydroxyl value of the target product.

Patent No. CN03155029.0 discloses a method using a reactive initiating mixture. The target polymer produced from the method has a low molecular weight, and thus the method cannot be used in the production of a long-chain polyether. Furthermore, the low molecular-weight alcohol is not added continuously in the method, which leads to a high content of the low molecular-weight alcohol in the reaction system, and results in a relatively long induction time and reaction time.

Patent No. CN200710138709.8 discloses a method for producing a polyether resistant to high water content. The method mainly aims to produce a polyether resistant to high water content, and reduces the influence of water content in the initiating material after reaction. This method is used to directly produce the target polymer, so the yield is low. During the continuous production process, the induction time of the reaction is long. In the example of polyether production, propylene glycol and propylene oxide are added together and terminated at the same time, which causes the target product to have a wide molecular weight distribution (either weight average molecular weight or number average molecular weight), and affects the performance of the target product.

Patent No. CN201010217182.X discloses a method for producing a short-chain polyether polyol with a starter compound having ultra-low water content in the presence of a DMC catalyst. The product formed by the method is a short-chain polyether polyol with limited applications owing to that the starter compound is a low molecular-weight alcohol having less than 500 ppm of water. Moreover, the method cannot be used in the production of a long-chain polyether polyol. Further, the short-chain polyether polyol produced during the reaction process requires post-processing, which greatly increases the discharge of solid and/or liquid waste from the reaction and the production cost. In some examples, glycerol and propylene oxide are continuously and simultaneously added, which causes the product to have a wide molecular weight distribution.

Patent No. CN201280015084.5 discloses a method for producing a short-chain multi-functional polyether polyol by using a super acid and a DMC catalyst. The target product is a short-chain multi-functional polyether polyol obtained from a starter compound with a low molecular weight. The starter compound contains 3 to 9 hydroxyl groups and excludes the use of monohydric alcohol and dihydric alcohol. Meanwhile, the method involves propylene oxide and a low molecular-weight starter compound such as glycerol being fed into the reactor at the same time, which causes the reaction rate to slow down, and the reaction may terminate prematurely.

In contrast, the present disclosure uses a low molecular-weight polyether initially prepared with a base catalyst as an initiator. For example, the initiator may be a polyether diol or triol having a molecular weight in the range of 400 or 600. An amount of DMC catalyst is added into the process to induct the reaction. Propylene glycol or glycerol and propylene oxide or a mixture of propylene oxide with ethylene oxide are then proportionally introduced into the reaction. A portion of the reaction product is removed and, in the meantime, the DMC catalyst is supplemented such that the amount of the DMC catalyst in the target product is maintained at a specific amount, for example 30 ppm. At a certain temperature and with almost no induction time, propylene oxide or a mixture of propylene oxide with ethylene oxide is introduced into the reaction to achieve the final molecular weight. For example, a polyether diol as a final product generally has a molecular weight of 1000, 2000, or 4000, and a polyether triol generally has a molecular weight of 3000. However, the final molecular weight is not limited thereto.

SUMMARY

In view of the above problems, an objective of the present disclosure is to provide a method for producing a final molecular-weight polyether polyol through an intermediate-target polyether polyol in a continuous reaction cycle, which is simple in operation, convenient for production, and may reduce the production cost of most applications.

To achieve the above objective, the following technical solutions may be adopted in the present disclosure. A method for cyclically preparing a polyether polyol by using a DMC catalyst is provided. In the method, a low molecular-weight alcohol is used as a starter compound which is polymerized with an alkylene oxide to obtain a low molecular-weight polymer. The low molecular-weight polymer is used as an initiator for a reaction in the presence of a DMC catalyst and an acid promoter. During the reaction of the low molecular-weight polymer with the alkylene oxide, an amount of low molecular-weight alcohol is introduced to obtain an intermediate-target polymer. A portion of the intermediate-target polymer may be used for producing the final molecular-weight polymer (target product or target polymer), and the other portion of the intermediate-target polymer may be recycled and fed back to the reactor. The intermediate-target polymer may have the same average molecular weight as that of the low molecular-weight polymer.

In the present disclosure, the DMC catalyst may be a double metal cyanide complex catalyst for ring opening in the polymerization of epoxy.

In the present disclosure, the acid may be one of nitric acid, phosphoric acid, and sulfuric acid, or a mixture of any two or three thereof.

In the present disclosure, the alkylene oxide may be one of propylene oxide, butylene oxide, a mixture of ethylene oxide and propylene oxide, a mixture of ethylene oxide and butylene oxide, a mixture of propylene oxide and butylene oxide, and a mixture of ethylene oxide, propylene oxide, and butylene oxide.

In the present disclosure, the low molecular-weight alcohol may be a monohydric alcohol or a polyhydric alcohol. The monohydric alcohol may be one of allyl alcohol or butanol, and the polyhydric alcohol may be one of ethylene glycol, propylene glycol, butylene glycol, and glycerol.

During the preparation of the target polymer in the present disclosure, the intermediate-target polymer may be used as an initiator, the DMC may be used as a catalyst, and the acid may be used as a promoter. During the reaction, an amount of low molecular-weight alcohol may be introduced at the same time when the alkylene oxide is introduced.

The method for cyclically preparing a polyether polyol by using a DMC catalyst provided in the present disclosure comprises the steps of:

1) Adding a low molecular-weight polymer as the initiator into a reactor, wherein the low molecular-weight polymer may be pre-added with a DMC catalyst and an acid to form a mixture. The mixture may further be subject to the processes of depressurizing, heating, and dewatering by bubbling nitrogen through the mixture for at least 10 minutes at a temperature between 100-175° C. and at a pressure not higher than −0.085 MPa. Then the nitrogen source to the reactor is turned off, and the reactor may further be evacuated for at least 10 minutes.

2) Introducing the alkylene oxide in an amount no more than 20% by weight (wt %) of the low molecular-weight polymer in Step 1), such that the pressure in the reactor is induced to decrease obviously, and the temperature is induced to rise obviously.

3) While keeping the temperature between 120-180° C. and the pressure not higher than 0.2 MPa, adding alkylene oxide and low molecular-weight alcohol proportionally in weight into the reactor. At least over 10 wt % of the alkylene oxide is added after the addition of the low molecular-weight alcohol is completed. Evacuating the reactor after the reaction is complete and there is no obvious decrease in the pressure in the reactor. Discharging the reactor after the temperature drops to between 70-80° C. to obtain the intermediate-target polymer, wherein a portion of the intermediate-target polymer is used for producing the final molecular-weight polymer, and another portion of the intermediate-target polymer is recycled back to the reactor.

4) Adding the recycled intermediate-target polymer obtained in Step 3) into the reactor, wherein the intermediate-target polymer is pre-added with the DMC catalyst and the acid into the previous mixture which may be subject to the processes of depressurizing, heating, and dewatering by bubbling nitrogen through the previous mixture for at least 10 minutes at a temperature between 100-175° C. and at a pressure not higher than −0.085 MPa. Then the nitrogen source to the reactor is turned off, and the reactor is further evacuated for at least 10 minutes.

5) Introducing the alkylene oxide in an amount no more than 20 wt % of the intermediate-target polymer in Step 4) after depressurizing and dewatering, such that the pressure in the reactor is induced to decrease obviously, and the temperature is induced to rise obviously.

6) While keeping the temperature between 120-180° C. and the pressure not higher than 0.2 MPa, adding the alkylene oxide and low molecular-weight alcohol proportionally in weight into the reactor. At least over 10 wt % of the alkylene oxide is added after the addition of the low molecular-weight alcohol is completed. Evacuating the reactor after the reaction is complete and there is no obvious decrease in the pressure in the reactor. Discharging the reactor after the temperature drops to between 70-80° C. to obtain the final molecular-weight polymer; and 7) Recycling the intermediate-target polymer into the reactor in a continuous cycle to obtain the final molecular-weight polymer following the operations in Steps 1-6.

In the present disclosure, the target polymer may be a polyoxyalkylene ether monol, and the average molecular weight of both the low molecular-weight polymer and the intermediate-target polymer is between 200 and 600, and preferably between 300 and 500.

In the present disclosure, the target polymer may be a polyoxyalkylene ether diol, and the average molecular weight of both the low molecular-weight polymer and the intermediate-target polymer is between 400 and 1000, and preferably between 500 and 700.

In the present disclosure, the target polymer may be a polyoxyalkylene ether triol, and the average molecular weight of both the low molecular-weight polymer and the intermediate-target polymer is between 500 and 1200, and preferably between 700 and 1000.

In the present disclosure, the alkylene oxide may be a mixture containing ethylene oxide and ethylene oxide, and the content of ethylene oxide in the mixture may be not higher than 80%.

In the present disclosure, the content of K+ and Na+ in the low molecular-weight polymer in Step 1) are less than 10 ppm respectively, and preferably less than 5 ppm respectively.

In the present disclosure, the DMC catalyst added in Step 1) may be in an amount of 10-600 ppm, preferably in an amount of 20-120 ppm, and more preferably in an amount of 30-100 ppm based on the weight of the intermediate-target polymer obtained in Step 3).

In the present disclosure, the DMC catalyst added in Step 4) may be in an amount of 0-500 ppm, preferably in an amount of 20-60 ppm, and more preferably in an amount of 20-40 ppm based on the weight of the final molecular-weight polymer obtained in Step 6).

In the present disclosure, the acid added in Steps 1), 3), 4) and 6) may be preferably one of sulfuric acid, phosphoric acid, and a mixture thereof.

In the present disclosure, the low molecular-weight polymer in Steps 1) and 4) may contain no more than 200 ppm acid and preferably no more than 80 ppm acid.

In the present disclosure, the low molecular-weight alcohol in Steps 3) and 6) may contain no more than 200 ppm acid and preferably no more than 80 ppm acid.

In the present disclosure, the dewatering temperature in Steps 1) and 4) may be preferably between 130-165° C., and the dewatering pressure may be preferably below −0.095 MPa, and the time of dewatering by bubbling nitrogen is preferably between 40-90 minutes, and the evacuating time may be preferably between 20-40 minutes after the nitrogen source is turned off.

In the present disclosure, the amount of the alkylene oxide added in Step 2) for initiating the reaction may be no more than 3-10 wt % of the low molecular-weight starter compound in Step 1).

In the present disclosure, the amount of the alkylene oxide added in Step 5) for initiating the reaction may be no more than 3-10 wt % of the intermediate-target polymer in Step 4).

In the present disclosure, the addition of the low molecular-weight alcohol in Steps 3) and 6) may be completed before the addition of the alkylene oxide is completed, and preferably 20-40 wt % of the total weight of the alkylene oxide may be added after the addition of the low molecular-weight alcohol is completed.

In the present disclosure, the alkylene oxide may be preferably added in Steps 3) and 6) at a temperature between 130-160° C., and the feed pressure may be preferably below 0.03 Mpa, and more preferably below −0.05 MPa.

The present disclosure may have the following advantages. In the present disclosure, the low molecular-weight alcohol and the low molecular-weight polyether polyol react in the presence of the DMC catalyst to obtain the intermediate-target polymer. A portion of the intermediate-target polymer is used for producing the final molecular-weight polymer which may be a polyether polyol having a molecular weight greater than that of the intermediate-target polymer. The other portion of the intermediate-target polymer is recycled back to the reactor to participate in the reaction process with the low molecular-weight alcohol in the presence of the DMC catalyst.

Compared with an existing method for preparing a high molecular-weight target product from a low molecular-weight polyether polyol initiator, there is no need to use the low molecular-weight polyether polyol prepared with a base catalyst as an initiator at each time. Therefore, the present disclosure is advantageous over the commonly used processes at present in that perspective.

The loss of material may be reduced. When a base catalyst is used to prepare a low molecular-weight starter compound, about 2% polyether may be lost during the refining process of the polyether. In the present disclosure, the base catalyst is used only at the first time when the starter compound is prepared, thus greatly reducing the loss of material.

The discharge of residue and waste water may be reduced. When a base catalyst is used to prepare a low molecular-weight polyether polyol initiator, about 3% residue and 5% waste water may be produced during the refining process of the polyether. In the present disclosure, the base catalyst is used only at the first time when the initiator is prepared, thus greatly reducing the discharge of the residue and waste water.

The number of apparatuses used in the present disclosure may be significantly fewer, for example, a dedicated reactor for making the low molecular-weight initiator without the need of a corresponding post-processing unit and supporting facilities.

The target polymer prepared in the present disclosure may have an extremely faint odor.

During the preparation of the intermediate-target polymer in the present disclosure, when the intermediate-target polymer is used to prepare the target polymer, the DMC catalyst has already been activated and almost no induction time is needed, thus the dewatering time and induction time may be reduced greatly, and the utilization of the apparatus may be improved.

DETAILED DESCRIPTION

The present disclosure is described in further detail with reference to specific embodiments.

It should be noted that the starter compounds used in reaction examples below are merely for illustrative purposes, and the protection scope of the present disclosure is not limited thereto the cited starter compounds.

The DMC catalyst used in the present disclosure is prepared following the method as described in ZL200710019506.7, however the double metal cyanide complex catalysts may be prepared following the method as described in CN201410121198.9, CN03813844.1, and CN200680024203.8.

EXAMPLE 1

Preparation of Intermediate-target Polymer Polyoxypropylene Propylene Glycol Ether ($M_n$=600) from the Initiator Polyoxypropylene Propylene Glycol Ether ($M_n$=600) and Propylene Glycol 1) In a 10 m³ reactor equipped with an external circulating pump, 2200 kg polyoxypropylene propylene glycol ether (M n=600) initiator (which might be prepared with a conventional KOH catalyst, contained <5 ppm of K+ and Na+ ions, and is premixed with 66 g concentrated sulfuric acid) and 402 g DMC catalyst are added into the reactor to form a mixture. The mixture is stirred, purged with nitrogen, evacuated, and heated. The external circulating pump is activated, and dewatering is performed under vacuum by bubbling nitrogen for 60 minutes at a temperature between 135-145° C. under a pressure below −0.095 MPa. The nitrogen source is turned off, and the reactor is evacuated for an additional 20 minutes.

2) The vacuum valve connected to the reactor is closed to stop evacuating, and 176 kg propylene oxide is introduced into the reactor. The initiation of reaction is indicated by a significant pressure drop reactor and a significant temperature rise in the reactor.

3) While the temperature is kept at between 150-160° C., and the pressure is kept below −0.02 MPa, 3395 kg propylene oxide and 740 kg propylene glycol (premixed with 37 g concentrated sulfuric acid) are added into the reactor simultaneously in a continuous-feed manner. 1531 kg propylene oxide is added into the reactor 220 minutes after the addition of propylene oxide and propylene glycol is completed. It may take 80 minutes for the addition of propylene oxide to be completed, and the reaction may proceed until there is no obvious pressure drop in the reactor. The reactor is then evacuated to remove remaining gases, and the vacuum valve is closed once the remaining gases are removed. The material in the reactor is discharged after the temperature of the reactor is cooled to 70-80° C. An intermediate-target polymer polyoxypropylene propylene glycol ether (M n=600) is obtained, a portion of which is used for preparing the target polymer, and the other portion is recycled back to the reactor.

The obtained intermediate-target polymer polyoxypropylene propylene glycol ether (M n=600) is analyzed to have a DMC content of 50 ppm, a hydroxyl value (mg KOH/g) of 188.74, a viscosity (25° C., mPa·s) of 107, and a molecular-weight distribution (either weight average molecular weight or number average molecular weight) D of 1.14.

EXAMPLE 2

Preparation of Polyoxyethylene/Propylene Propylene Glycol Ether ($M_n$=2000) from Intermediate-Target Polymer Polyoxypropylene Propylene Glycol Ether ($M_n$=600)

1) In a 10 m³ reactor equipped with an external circulating pump, 2400 kg target intermediate polymer polyoxypropylene propylene glycol ether (M n=600) prepared in Example 1 as an initiator, and 120 g DMC catalyst are added into the reactor to form a mixture. The mixture is stirred, purged with nitrogen, evacuated, and heated. The external circulating pump is activated, and the reactor is evacuated for 30 minutes at a temperature between 135-145° C. under a pressure below −0.095 MPa.

2) The vacuum valve connected to the reactor is closed to stop evacuating, and 192 kg alkylene oxide mixture (in which ethylene oxide/propylene oxide was 2:8) is introduced into the reactor. The initiation of reaction is indicated by a significant temperature rise in the reactor.

3) While the temperature is kept at 130-135° C., and the pressure is kept below 0.02 MPa, 5408 kg alkylene oxide mixture (in which ethylene oxide to propylene oxide ratio is 2:8) is introduced into the reactor in a continuous-feed manner. It may take 160 minutes for the addition of the alkylene oxide mixture to be completed, and the reaction may proceed until there is no obvious pressure drop in the reactor. The reactor is then evacuated to remove remaining gases, and the vacuum valve is closed once the remaining gases are removed. The material is discharged after the temperature of the reactor is cooled to between 70-80° C., and the target polymer polyoxyethylene/propylene propylene glycol ether (M n=2000) is obtained.

The target polymer polyoxyethylene/propylene propylene glycol ether (M n=2000) is analyzed to have a DMC content of 30 ppm, a hydroxyl value (mg KOH/g) of 55.81, a viscosity (25° C., mPa·s) of 300, and a molecular weight distribution (either weight average molecular weight or number average molecular weight) D of 1.04.

EXAMPLE 3

Preparation of Intermediate-target Polymer Polyoxypropylene Propylene Glycol Ether ($M_n$=600) from Intermediate-Target Polymer Polyoxypropylene Propylene Glycol Ether ($M_n$=600) and Propylene Glycol 1) In a 10 m³ reactor equipped with an external circulating pump, 1800 kg intermediate-target polymer polyoxypropylene propylene glycol ether (M n=600) prepared in Example 1 as an initiator (premixed with 54 g concentrated sulfuric acid) and 310 g DMC catalyst are added into a reactor to form a mixture. The mixture is stirred, purged with nitrogen, evacuated, and heated. The external circulating pump is activated, and the reactor is evacuated for 30 minutes at a temperature 135-145° C. under a pressure below −0.095 MPa.

2) The vacuum valve connected to the reactor is closed to stop evacuating, and 144 kg propylene oxide is introduced into the reactor. The initiation of the reaction is indicated by a significant temperature rise in the reactor.

3) While the temperature is kept at 150-160° C., and the pressure is kept below −0.02 MPa, 3645 kg propylene oxide and 785 kg propylene glycol (premixed with 39 g concentrated sulfuric acid) are added into the reactor in a continuous-feed manner. 1624 kg propylene oxide is further added 200 minutes after the addition of propylene oxide and propylene glycol is completed. It may take 80 minutes for the addition of propylene oxide to be completed, and the reaction may proceed until there was no obvious pressure drop in the reactor. The reactor is then evacuated to remove remaining gases, and the vacuum valve is closed once the remaining gases are removed. The material is discharged after the temperature is cooled to between 70-80° C., and an intermediate-target polymer polyoxypropylene propylene glycol ether (M n=600) is obtained, a portion of which is used for preparing the target polymer, and the other portion is recycled back to the reactor.

The obtained intermediate-target polymer polyoxypropylene propylene glycol ether (M n=600) is analyzed to have a DMC content of 50 ppm, a hydroxyl value (mg KOH/g) of 185.96, a viscosity (25° C., mPa·s) of 112, and a molecular weight distribution (either weight average molecular weight or number average molecular weight) D of 1.17.

COMPARATIVE EXAMPLE 1 (RELATING TO EXAMPLES 1 AND 3)

Preparation of Intermediate-target Polymer Polyoxypropylene Propylene Glycol Ether ($M_n$=600) from Low Molecular-weight Alcohol Propylene Glycol 1) In a 10 m³ reactor equipped with an external circulating pump, 1013 kg propylene glycol as an initiator, and 24 kg KOH as a catalyst are added into a reactor to form a mixture. The mixture is stirred, purged with nitrogen, and evacuated for 5 minutes. Then, the external circulating pump is activated.

2) The vacuum valve connected to the reactor is closed to stop evacuating, and 100 kg propylene oxide is introduced into the reactor at a temperature ranging from 110 to 120° C.

The initiation of the reaction is indicated by a slow temperature rise and a slow pressure drop.

3) While the temperature is kept at 110-120° C., and the pressure is kept below 0.4 MPa, 6887 kg propylene oxide is added into the reactor in a continuous-feed manner. It may take 300 minutes for the addition of propylene oxide to be completed, and the reaction may proceed until there was no obvious pressure drop in the reactor. The reactor is then evacuated to remove remaining gases, and the vacuum valve is closed once the remaining gases are removed. After the temperature of the reactor is cooled to between 90-100° C., the material is transferred to a post-processing unit.

4) 400 kg water is added to the post-processing unit and stirred for 30 minutes. 45 kg of 85% phosphoric acid is added and stirred for 60 minutes. 12 kg refining agent and 16 kg clay were added and stirred for 30 minutes. Dewatering is conducted for 4 hours at 110-120° C. under −0.095 MPa. After filtering, cooling, and discharging, the intermediate-target polymer polyoxypropylene propylene glycol ether (M n=600) is obtained, all of which is used for producing the target polymer.

The obtained intermediate-target polymer polyoxypropylene propylene glycol ether ($M_n$=600) is analyzed to have a hydroxyl value (mg KOH/g) of 185.96, a viscosity of (25° C., mPa·s) 102; a $K^+$ and $Na^+$ content less than 5 ppm respectively, and a molecular weight distribution (either weight average molecular weight or number average molecular weight) D of 1.24.

A portion of the intermediate-target polymer prepared with a base catalyst in Example 1 is used to prepare the target polymer in Example 2, and the other portion is recycled to prepare the intermediate-target polymer in the presence of the DMC catalyst in Example 3, so that no intermediate-target polymer prepared with a base catalyst is used in further preparation of the target polymer. However, the total amount of intermediate-target polymer prepared with a base catalyst in Comparative Example 1 is used to prepare the target polymer, so the process for preparing the needed intermediate-target polymer with a base catalyst in Comparative Example 1 needs to be repeated when producing the next batch of the target polymer. Therefore, in the present disclosure, no post-processing is needed once the intermediate-target polymer is recycled for reproduction, thereby reducing the production time, lowering the loss of material and energy consumption, and decreasing the discharge of residue and waste water.

Under the same conditions, the production time, the loss of material per unit of product, the energy consumption, and the amounts of discharged solid waste and waste water resulting from prior art processes and the present method for preparing different products are listed in a table below.

| Starter compound of low molecular-weight alcohol | Target polymer | $M_n$ | Process | Yield t | Post-processing time min/ton of product | Induction time min/reactor | Dewatering time min/reactor | Loss of material kg/ton of product | residue kg/ton of product | Waste water kg/ton of product |
|---|---|---|---|---|---|---|---|---|---|---|
| Monohydric alcohol | Allyl alcohol | 1500 | The present disclosure | 90 | 6 | <2 | 30 | 2.5 | 2.5 | 4.2 |
| | | | Prior art | | 18 | 16 | 80 | 8 | 8 | 13 |
| | | 900 | The present disclosure | 36 | 15 | <2 | 30 | 7 | 7 | 11 |
| | | | Prior art | | 45 | 16 | 80 | 20 | 20 | 33 |
| Dihydric alcohol | Ethylene glycol | 1600 | The present disclosure | 64 | 8 | <2 | 30 | 4 | 4 | 6 |
| | | | Prior art | | 25 | 16 | 80 | 12 | 12 | 19 |
| | Propylene glycol | 2000 | The present disclosure | 80 | 7 | <2 | 30 | 3 | 3 | 5 |
| | | | Prior art | | 21 | 16 | 80 | 9 | 9 | 15 |
| | Butylene glycol | 2500 | The present disclosure | 100 | 5 | <2 | 30 | 2 | 2 | 4 |
| | | | Prior art | | 16 | 17 | 80 | 7 | 7 | 12 |
| Trihydric alcohol | Glycerol | 3000 | The present disclosure | 90 | 6 | <2 | 30 | 2.5 | 2.5 | 4.2 |
| | | | Prior art | | 18 | 16 | 80 | 8 | 8 | 13 |

Remark
1. The loss of material, residue, and waste water in the table include exclusively the loss, residue, and waste water resulting from the process itself.
With the increase of the yield, that is, with the increase of the cycle number, the intermediate-target polymer used in the present disclosure requires no post-processing, and thus no new post-processing time, residue, and waste water are produced, whereby the post-processing time, residue, and waste water are approximately 0.
With the increase of the yield, after the intermediate-target polymer prepared with a base catalyst in the prior art is consumed totally, the intermediate-target polymer prepared with a base catalyst has to be produced and post-processed again, so the post-processing time, residue, and waste water are produced again, whereby the post-processing time, residue, and waste water are approximately a constant value.
The loss of material is calculated based on the whole process from the preparation of the intermediate-target polymer from a low molecular-weight alcohol and then to the preparation of the target polymer from the intermediate-target polymer.

EXAMPLE 4

Preparation of Polyoxypropylene Ether ($M_n$=3000) from Intermediate-target Polymer Polyoxypropylene Glycerol Ether ($M_n$=800) and Glycerol 1) In a 10 m³ reactor equipped with an external circulating pump, 800 kg cyclically prepared intermediate-target polymer polyoxypropylene glycerol ether ($M_n$=800) as an initiator (premixed with 24 g phosphoric acid) and 182 g DMC catalyst are added into a reactor to form a mixture. The mixture is stirred, purged with nitrogen, evacuated, and heated. The external circulating pump is activated, and the reactor was evacuated for 30 minutes at a temperature 135-145° C. under a pressure below −0.095 MPa.

2) The vacuum valve connected to the reactor is closed to stop evacuating and 64 kg propylene oxide is introduced into the reactor. The initiation of the reaction is indicated by a significant temperature rise in the reactor.

3) While the temperature is kept at 130-135° C. and the pressure is kept below −0.02 MPa, 4196 kg propylene oxide and 155 kg glycerol (premixed with 7.8 g phosphoric acid) are added into the reactor in a continuous-feed manner. 2839 kg propylene oxide is further added 150 minutes after the addition of propylene oxide and glycerol is completed. It may take 60 minutes for the addition of propylene oxide to be completed, and the reaction may proceed until there was no obvious pressure drop in the reactor. The reactor is evacuated to remove remaining gases, and then the vacuum valve is closed once the remaining gases are removed. The material is discharged after the temperature is cooled to 70-80° C., and the target polymer polyoxypropylene glycerol ether ($M_n$=3000) is obtained.

The obtained target polymer polyoxypropylene glycerol ether ($M_n$=3000) is analyzed to have a DMC content of 30 ppm, a hydroxyl value (mg KOH/g) of 56.93, a viscosity (25° C., mPa·s) of 567, and a molecular weight distribution (either weight average molecular weight or number average molecular weight) D of 1.06.

COMPARATIVE EXAMPLES 2-5 (RELATING TO EXAMPLE 4)

Preparation of Polyoxypropylene Ether ($M_n$=3000) from Intermediate-target Polymer Polyoxypropylene Glycerol Ether ($M_n$=800) and Glycerol Except for the reservation ratio of PO, all the conditions and amounts of materials in Comparative Examples 2-5 are the same as those in Example 4. When the reservation ratio of PO is less than 10%, the molecular weight distribution of the target polymer is wide. When the reservation ratio of PO is larger than 80%, the reaction may fail to proceed.

|  | Reservation ratio of PO | Reaction time minutes | Molecular weight distribution weight average molecular weight/number average molecular weight |
|---|---|---|---|
| Example 4 | 40% | 210 | 1.06 |
| Comparative Example 2 | 8% | 203 | 1.58 |
| Comparative Example 3 | 10% | 215 | 1.37 |
| Comparative Example 4 | 80% | 619 | 1.39 |
| Comparative Example 5 | 85% | After the introduction of glycerol and PO is started, the pressure in the reactor does not decrease any longer, and the reaction is terminated. | — |
| Remark | The reservation ratio of PO refers to the ratio of alkylene oxide introduced after the addition of the low molecular-weight alcohol is completed to the total amount of alkylene oxide, with the provision that the low molecular-weight alcohol and the remaining alkylene oxide are added simultaneously beforehand | | |

EXAMPLE 20

The experiment results obtained in the examples of the present disclosure are summarized, and the comparisons between the target products prepared by the present disclosure and the prior art method are listed in a table below.

Results of comparison of polyether polyol prepared from various raw materials

| Starter compound of low molecular-weight alcohol | | Low molecular-weight polymer ($M_n$) | Intermediate molecular-weight polymer ($M_n$) | Target polymer | | | Induction time (min) | Dewatering time (min) |
|---|---|---|---|---|---|---|---|---|
| | | | | Molecular weight ($M_n$) | Hydroxyl value (mg KOH/g) | Molecular weight distribution | | |
| Monohydric alcohol | Allyl alcohol | 200 | 200 | 1496 | 37.5 | 1.22 | 8 | 30 |
| | | 600 | 600 | 1484 | 37.8 | 1.18 | <2 | 30 |
| | | 400 | 400 | 1504 | 37.3 | 1.06 | <2 | 30 |
| | | Prior art | | 1492 | 37.6 | 1.24 | 16 | 80 |
| | Butanol | 200 | 200 | 889 | 63.1 | 1.17 | 8 | 30 |
| | | 600 | 600 | 904 | 62.1 | 1.16 | <2 | 30 |
| | | 400 | 400 | 898 | 62.5 | 1.08 | <2 | 30 |
| | | Prior art | | 893 | 62.8 | 1.21 | 18 | 80 |
| Dihydric alcohol | Ethylene glycol | 400 | 400 | 1617 | 69.4 | 1.18 | 5 | 30 |
| | | 1000 | 1000 | 1605 | 69.9 | 1.18 | <2 | 30 |
| | | 600 | 600 | 1587 | 70.7 | 1.07 | <2 | 30 |
| | | Prior art | | 1587 | 70.7 | 1.21 | 17 | 80 |

-continued

Results of comparison of polyether polyol prepared from various raw materials

| Starter compound of low molecular-weight alcohol | | Low molecular-weight polymer ($M_n$) | Intermediate molecular-weight polymer ($M_n$) | Target polymer | | | Induction time (min) | Dewatering time (min) |
|---|---|---|---|---|---|---|---|---|
| | | | | Molecular weight ($M_n$) | Hydroxyl value (mg KOH/g) | Molecular weight distribution | | |
| | Propylene glycol | 400 | 400 | 2020 | 55.5 | 1.19 | 5 | 30 |
| | | 1000 | 1000 | 1992 | 56.3 | 1.18 | <2 | 30 |
| | | 600 | 600 | 2008 | 55.8 | 1.07 | <2 | 30 |
| | | Prior art | | 2012 | 55.7 | 1.20 | 15 | 80 |
| | Butylene glycol | 400 | 400 | 2507 | 44.8 | 1.19 | 7 | 30 |
| | | 1000 | 1000 | 2510 | 44.7 | 1.19 | <2 | 30 |
| | | 600 | 600 | 2495 | 45.0 | 1.06 | <2 | 30 |
| | | Prior art | | 2490 | 45.1 | 1.20 | 17 | 80 |
| Trihydric alcohol | Glycerol | 500 | 500 | 3011 | 55.9 | 1.20 | 5 | 30 |
| | | 1200 | 1200 | 2997 | 56.2 | 1.23 | <2 | 30 |
| | | 800 | 800 | 2990 | 56.3 | 1.05 | <2 | 30 |
| | | Prior art | | 3005 | 56.0 | 1.26 | 18 | 80 |

It can be seen from the table above that the target polymer produced through the technical solution of the present disclosure may have a narrow molecular weight distribution compared with the target polymer produced in the prior art, and the induction time and dewatering time are short in the present disclosure. By using the technical solution of the present disclosure, the molecular weight distribution of the target polymer may be wide in the situation that the intermediate-target polymer has a low or high molecular weight distribution.

EXAMPLE 21

The results for the target products prepared under some reaction conditions different from those in the present disclosure by which the intermediate-target polymer ($M_n$=600) and the target polymer ($M_n$=2500) are prepared with butylene glycol as a starter compound while the other reaction conditions are kept unchanged, are listed in a table below:

Comparison of the effect of different reaction conditions in the present disclosure on the target products

| Reaction condition | Weight of alkylene oxide initiating the reaction in Step 2)/weight of low molecular-weight initiator in Step 1), (%) | Weight of alkylene oxide initiating the reaction in Step 5)/weight of intermediate-target polymer in Step 4), (%) | Acid content in initiator in Steps 1) and 4) (ppm) | Hydroxyl value (mg KOH/g) | Molecular weight distribution (weight average molecular weight/number average molecular weight) | Appearance of product |
|---|---|---|---|---|---|---|
| No. 1 | 20 | 20 | 200 | 44.5 | 1.21 | Light brown |
| No. 2 | 3 | 3 | 80 | 44.1 | 1.19 | Colorless and clear |
| No. 3 | 10 | 10 | 50 | 45.1 | 1.06 | Colorless and clear |
| No. 4 | 3 | 3 | 80 | 44.7 | 1.18 | Colorless and clear |
| No. 5 | 10 | 10 | 50 | 44.2 | 1.07 | colorless and clear |
| No. 6 | 25 | 25 | 150 | 44.8 | 1.29 | Light brown |
| No. 7 | 15 | 15 | 250 | 45.1 | | The reaction cannot be initiated due to an excessively high acid content. |
| No. 8 | 22 | 22 | 80 | 44.3 | 1.21 | Dark color |
| No. 9 | 5 | 5 | 30 | 44.5 | 1.12 | colorless and clear |

It can be seen from the table above that during the production of the target polymer through the technical solution of the present disclosure, the target polymer may have a wide molecular weight distribution in the situation that the amounts of alkylene oxide is not optimal (small or large), or the amount of acid is too high. When the acid is introduced in a large amount, the color of the target product is dark. When the acid is introduced in an excessively large amount, the reaction cannot be initiated.

EXAMPLE 22

The results for the target products, prepared under the same conditions in the method of the present disclosure by which the intermediate-target polymer ($M_n$=600) and the target polymer ($M_n$=1600) are prepared with ethylene glycol as a starter compound except that different acids and alkylene oxide are used, are listed in a table below:

Comparison of the effect of different acids and alkylene oxide in the present disclosure on the target products

| Reaction condition | Acid | Alkylene oxide | Amount of DMC catalyst in Step 1) (ppm) | Amount of DMC catalyst in Step 4) (ppm) | Hydroxyl value (mg KOH/g) | Molecular weight distribution (weight average molecular weight/number average molecular weight) |
|---|---|---|---|---|---|---|
| Example 1 | Sulfuric acid | Propylene oxide 100% | 30 | 40 | 70.2 | 1.04 |
| Example 2 | Phosphoric acid | Butylene oxide 100% | 20 | 20 | 70.8 | 1.28 |
| Example 3 | Nitric acid | Ethylene oxide 80% Propylene oxide 20% | 10 | 0 | 71.1 | 1.34 |
| Example 4 | Sulfuric acid Phosphoric acid | Ethylene oxide 90% Propylene oxide 10% | 100 | 400 | The proportion of ethylene oxide is relatively high and the reaction rate is low, the product appears cloudy in a later stage of the reaction. | |
| Example 5 | Sulfuric acid Nitric acid | Ethylene oxide 50% Butylene oxide 50% | 120 | 60 | 70.5 | 1.05 |
| Example 6 | Phosphoric acid Nitric acid | Propylene oxide 50% Butylene oxide 50% | 400 | 0 | 70.0 | 1.07 |
| Example 7 | Sulfuric acid Phosphoric acid Nitric acid | Ethylene oxide 30% Propylene oxide 40% Butylene oxide 40% | 600 | 500 | 69.7 | 1.32 |

It can be seen from the table above that by means of the technical solution of the present disclosure, the species of acids has no obvious effect on the target product under different reaction conditions. When the proportion of ethylene oxide in the alkylene oxide is relatively high and the reaction rate is relatively slow, the product appears cloudy. When the amount of catalyst is relatively low or high, the product may have a wide molecular weight distribution.

It should be noted that the foregoing descriptions are merely preferred examples of the present disclosure, and the protection scope of the present disclosure is not limited thereto. Any combinations or equivalent substitutions made based on the above examples are covered by the protection scope of the present disclosure.

What is claimed is:

1. A method of cyclically preparing a polyether polyol as a target polymer, the method comprising:
    polymerizing a low molecular-weight alcohol with an alkylene oxide to obtain a low molecular-weight polymer;
    obtaining an intermediate-target polymer by a first process in a reactor, the first process facilitating a first reaction of the low molecular-weight polymer with the alkylene oxide while a first amount of the low molecular-weight alcohol is introduced into the reactor; and
    obtaining the target polymer by a second process in the reactor using a first portion of the intermediate-target polymer,
    wherein:
        a second portion of the intermediate-target polymer is recycled for reproduction of the intermediate-target polymer,
        a double metal cyanide (DMC) catalyst is used as a catalyst of the first reaction,
        an acid is used as a promoter of the first reaction,
        the intermediate-target polymer and the low molecular-weight polymer have a same average molecular weight,
        the DMC catalyst is a double metal cyanide complex catalyst for ring opening in polymerization of epoxy,
        the acid is one of a nitric acid, a phosphoric acid, and a sulfuric acid, or a mixture of any two or three thereof,
        the alkylene oxide is one of a propylene oxide, a butylene oxide, a mixture of ethylene oxide and the propylene oxide, a mixture of an ethylene oxide and a butylene oxide, a mixture of the propylene oxide and the butylene oxide, and a mixture of the ethylene oxide, the propylene oxide and the butylene oxide, the low molecular-weight alcohol is a monohydric alcohol or a polyhydric alcohol, the monohydric alcohol being one of an allyl alcohol or a butanol, the polyhydric alcohol being one of an ethylene glycol, a propylene glycol, a butylene glycol, and a glycerol, and the first process comprises the following steps:
- 1a) introducing the low molecular-weight polymer into the reactor, the low molecular-weight polymer having been pre-added with the DMC catalyst and the acid;
- 1b) dewatering by a bubbling nitrogen for at least 10 minutes at a first temperature range of 100-175° C. under vacuum at a first pressure not higher than −0.085 MPa;
- 1c) turning off the bubbling nitrogen and further vacuuming for at least 10 minutes;
- 2) introducing into the reactor the alkylene oxide in an amount that is no more than 20% by weight (wt %) of the low molecular-weight polymer;
- 3a) simultaneously and continuously introducing the alkylene oxide and the first amount of the low molecular-weight alcohol into the reactor, the reactor maintained at a second temperature range of 120-180° C. and at a second pressure not higher than 0.2 MPa;
- 3b) introducing at least 10 wt % of the alkylene oxide into the reactor after the introducing of the first amount of the low molecular-weight alcohol is completed;
- 3c) waiting until no substantial pressure drop is observed in the reactor; and
- 3d) discharging the reactor to obtain the intermediate-target polymer.

2. The method of claim 1, wherein:

the second process facilitates a second reaction of the first portion of the intermediate-target polymer with the alkylene oxide while a second amount of the low molecular-weight alcohol is introduced into the reactor, the DMC catalyst is further used as a catalyst of the second reaction, the acid is further used as a promoter of the second reaction, and the second process comprises the following steps:
- 4a) introducing the first portion of the intermediate-target polymer into the reactor, the first portion of the intermediate-target polymer having been pre-added with the DMC catalyst and the acid;
- 4b) dewatering by the bubbling nitrogen for at least 10 minutes at the first temperature range of 100-175° C. under vacuum at the first pressure not higher than −0.085 MPa;
- 4c) turning off the bubbling nitrogen and further vacuuming for at least 10 minutes;
- 5) introducing into the reactor the alkylene oxide in an amount that is no more than 20 wt % of the first portion of the intermediate-target polymer;
- 6a) simultaneously and continuously introducing the alkylene oxide and the second amount of the low molecular-weight alcohol into the reactor, the reactor maintained at the second temperature range of 120-180° C. and at the second pressure not higher than 0.2 MPa;
- 6b) introducing at least 10 wt % of the alkylene oxide into the reactor after the introducing of the second amount of the low molecular-weight alcohol is completed;
- 6c) waiting until no substantial pressure drop is observed in the reactor; and
- 6d) discharging the reactor to obtain the target polymer.

3. The method of claim 1, further comprising steps of:
- 1) adding the low molecular-weight polymer as the first initiator to a reactor, wherein the low molecular-weight polymer is pre-added with the DMC catalyst and the acid; evacuating, heating, and dewatering by bubbling nitrogen for at least 10 minutes at a first temperature range of 100-175° C. under vacuum at a first pressure not higher than −0.085 MPa; and then closing the nitrogen source, and further evacuating for at least 10 minutes;
- 2) after the dewatering, introducing the alkylene oxide in an amount that is no more than 20% by weight (wt %) of the low molecular-weight polymer in Step 1), such that a significant pressure drop and a significant temperature rise in the reactor is induced;
- 3) while keeping a second temperature range at 120-180° C. and a second pressure not higher than 0.2 MPa in the reactor, simultaneously and continuously adding metered alkylene oxide and the low molecular-weight alcohol; adding at least 10 wt % of the alkylene oxide after the addition of the low molecular weight alcohol is completed; after the alkylene oxide is completely loaded and no obvious pressure drop in the reactor; evacuating and discharging in the reactor after the temperature in the reactor drops to 70-80° C. to obtain the intermediate-target polymer, wherein the first portion of the intermediate-target polymer is used for preparing the target polymer, and the second portion of the intermediate-target polymer is recycled back to the reactor for preparing the intermediate-target polymer;
- 4) adding the intermediate-target polymer obtained in Step 4) to the reactor, wherein the intermediate-target polymer is pre-added with the DMC catalyst and the acid; the evacuating, the heating, and the dewatering under vacuum by bubbling nitrogen is carried out for at least 10 minutes at the first temperature range of 100-175° C. under the first pressure not higher than −0.085 MPa; then closing the nitrogen source, and further retaining the evacuating for at least 10 minutes;
- 5) after the dewatering, terminating the evacuating, and introducing the alkylene oxide in an amount that is no more than 20 wt % of the intermediate-target polymer in Step 4), such that a significant pressure drop and a significant temperature rise in the reactor is induced;
- 6) while keeping the second temperature range at 120-180° C. and the second pressure not higher than 0.2 MPa, simultaneously and continuously adding metered alkylene oxide and the low molecular-weight alcohol; adding at least 10 wt % of the alkylene oxide after the addition of the low molecular-weight alcohol is completed; after the alkylene oxide is completely loaded and no obvious pressure drop in the reactor; evacuating and discharging the reactor after the temperature in the reactor drops to 70-80° C. to obtain the target polymer; and
- 7) with the intermediate-target polymer obtained Step 3) as the second initiator, cyclically preparing the intermediate-target polymer and the target polymer following operations in Steps 1-6.

4. The method of claim 1, wherein the target polymer is a polyoxyalkylene ether monol, and wherein an average molecular weight of both the low molecular-weight polymer and the intermediate-target polymer is 300-500.

5. The method of claim 1, wherein the target polymer is a polyoxyalkylene ether diol, and wherein an average molecular weight of both the low molecular-weight polymer and the intermediate-target polymer is 500-700.

6. The method of claim 1, wherein the target polymer is a polyoxyalkylene ether triol, and wherein an average molecular weight of both the low molecular-weight polymer and the intermediate-target polymer is 700-1000.

7. The method of claim 1, wherein the alkylene oxide is a mixture of propylene oxide and ethylene oxide containing no higher than 80% of ethylene oxide in the mixture.

8. The method of claim 3, wherein a content of $K^+$ and a content of $Na^+$ in the low molecular-weight polymer as the first initiator in Step 1) are less than 10 ppm respectively.

9. The method of claim 3, wherein the DMC catalyst is used in Step 1) in an amount of 10-600 ppm based on a weight of the intermediate-target polymer obtained in Step 3).

10. The method of claim 3, wherein the DMC catalyst is used in Step 4) in an amount of 0-500 ppm based on a weight of the target polymer obtained in Step 6).

11. The method of claim 3, wherein the acid in Steps 1), 3), 4) and 6) is the sulfuric acid, the phosphoric acid, or a mixture thereof.

12. The method of claim 3, wherein the low molecular-weight polymer as the first initiator in Steps 1) and 4) contains the acid no more than 200 ppm.

13. The method of claim 3, wherein the low molecular-weight alcohol in Steps 3) and 6) contains the acid no more than 200 ppm.

14. The method of claim 3, wherein the adding of the low molecular-weight alcohol is completed before consuming all the alkylene oxide in Steps 3) and 6), and 20-40 wt % of the alkylene oxide is reserved to be added after the addition of the low molecular-weight alcohol is completed.

15. The method of claim 2, further comprising steps of:
1) adding the low molecular-weight polymer as the first initiator to a reactor, wherein the low molecular-weight polymer is pre-added with the DMC catalyst and the acid; evacuating, heating, and dewatering by bubbling nitrogen for at least 10 minutes at a first temperature range of 100-175° C. under vacuum at a first pressure not higher than −0.085 MPa; and then closing the nitrogen source, and further evacuating for at least 10 minutes;
2) after the dewatering, introducing the alkylene oxide in an amount that is no more than 20% by weight (wt %) of the low molecular-weight polymer in Step 1), such that a significant pressure drop and a significant temperature rise in the reactor is induced;
3) while keeping a second temperature range at 120-180° C. and a second pressure not higher than 0.2 MPa in the reactor, simultaneously and continuously adding metered alkylene oxide and the low molecular-weight alcohol; adding at least 10 wt % of the alkylene oxide after the addition of the low molecular weight alcohol is completed; after the alkylene oxide is completely loaded and no obvious pressure drop in the reactor; evacuating and discharging in the reactor after the temperature in the reactor drops to 70-80° C. to obtain the intermediate-target polymer, wherein the first portion of the intermediate-target polymer is used for preparing the target polymer, and the second portion of the intermediate-target polymer is recycled back to the reactor for preparing the intermediate-target polymer;
4) adding the intermediate-target polymer obtained in Step 4) to the reactor, wherein the intermediate-target polymer is pre-added with the DMC catalyst and the acid; the evacuating, the heating, and the dewatering under vacuum by bubbling nitrogen is carried out for at least 10 minutes at the first temperature range of 100-175° C. under the first pressure not higher than −0.085 MPa; then closing the nitrogen source, and further retaining the evacuating for at least 10 minutes;
5) after the dewatering, terminating the evacuating, and introducing the alkylene oxide in an amount that is no more than 20 wt % of the intermediate-target polymer in Step 4), such that a significant pressure drop and a significant temperature rise in the reactor is induced;
6) while keeping the second temperature range at 120-180° C. and the second pressure not higher than 0.2 MPa, simultaneously and continuously adding metered alkylene oxide and the low molecular-weight alcohol; adding at least 10 wt % of the alkylene oxide after the addition of the low molecular-weight alcohol is completed; after the alkylene oxide is completely loaded and no obvious pressure drop in the reactor; evacuating and discharging the reactor after the temperature in the reactor drops to 70-80° C. to obtain the target polymer; and
7) with the intermediate-target polymer obtained Step 3) as the second initiator, cyclically preparing the intermediate-target polymer and the target polymer following operations in Steps 1-6.

16. The method of claim 15, wherein a content of $K^+$ and a content of $Na^+$ in the low molecular-weight polymer as the first initiator in Step 1) are less than 10 ppm respectively.

17. The method of claim 15, wherein the DMC catalyst is used in Step 1) in an amount of 10-600 ppm based on a weight of the intermediate-target polymer obtained in Step 3), and wherein the DMC catalyst is used in Step 4) in an amount of 0-500 ppm based on a weight of the target polymer obtained in Step 6).

18. The method of claim 15, wherein the acid in Steps 1), 3), 4) and 6) is the sulfuric acid, the phosphoric acid, or a mixture thereof.

19. The method of claim 15, wherein the low molecular-weight polymer as the first initiator in Steps 1) and 4) contains the acid no more than 200 ppm, and wherein the low molecular-weight alcohol in Steps 3) and 6) contains the acid no more than 200 ppm.

20. The method of claim 15, wherein the adding of the low molecular-weight alcohol is completed before consuming all the alkylene oxide in Steps 3) and 6), and 20-40 wt % of the alkylene oxide is reserved to be added after the addition of the low molecular-weight alcohol is completed.

* * * * *